US008372364B2

(12) United States Patent
Broll et al.

(10) Patent No.: US 8,372,364 B2

(45) Date of Patent: Feb. 12, 2013

(54) EXHAUST GAS AFTERTREATMENT SYSTEM

(75) Inventors: Peter Broll, Bregisch-Gladbach (DE); Markus Mueller, Bergisch-Gladbach (DE)

(73) Assignee: Deutz Aktiengesellschaft, Cologne (DE)

( * ) Notice: Subject to any disclaimer, the term of this patent is extended or adjusted under 35 U.S.C. 154(b) by 0 days.

(21) Appl. No.: 12/737,825

(22) PCT Filed: Aug. 20, 2009

(86) PCT No.: PCT/EP2009/006038

§ 371 (c)(1), (2), (4) Date: Mar. 24, 2011

(87) PCT Pub. No.: WO2010/020416

PCT Pub. Date: Feb. 25, 2010

(65) Prior Publication Data

US 2011/0182789 A1 Jul. 28, 2011

(30) Foreign Application Priority Data

Aug. 21, 2008 (DE) ......................... 10 2008 039 112

(51) Int. Cl.
*B01D 53/94* (2006.01)
*F01N 3/10* (2006.01)

(52) U.S. Cl. .................. 423/212; 423/213.2; 423/213.5; 423/213.7; 60/299; 60/301

(58) Field of Classification Search .................. 423/212, 423/213.2, 213.5, 213.7; 60/299, 301
See application file for complete search history.

(56) References Cited

U.S. PATENT DOCUMENTS

| | | | |
|---|---|---|---|
| 3,939,104 A * | 2/1976 | Campbell et al. | 502/245 |
| 4,215,542 A | 8/1980 | Kobayashi et al. | |
| 6,680,037 B1 * | 1/2004 | Allansson et al. | 423/215.5 |
| 6,823,663 B2 | 11/2004 | Hammerle et al. | |
| 2008/0127638 A1 | 6/2008 | Vaarkamp et al. | 60/297 |
| 2010/0037597 A1 * | 2/2010 | Eckhoff et al. | 60/286 |

FOREIGN PATENT DOCUMENTS

| | | |
|---|---|---|
| DE | 33 37 902 | 5/1985 |
| DE | 103 47 133 | 6/2004 |
| DE | 10 2004 049 289 A1 | 4/2006 |
| DE | 10 2006 022599 A1 | 11/2007 |
| EP | 1 054 722 B1 | 11/2000 |
| JP | 2000 2 82 852 | 10/2000 |
| JP | 2006009606 A | 1/2006 |

* cited by examiner

*Primary Examiner* — Timothy Vanoy
(74) *Attorney, Agent, or Firm* — Davidson, Davidson & Kappel, LLC

(57) ABSTRACT

An exhaust gas post treatment system for, in particular, a self-igniting internal combustion engine including a catalytic converter that is arranged in an exhaust gas line, a fine particle filter and an introduction device for a reduction agent arranged upstream of the catalytic converter in the direction of the flow of the exhaust gas, and to a method for operating said type of exhaust gas post treatment system. An exhaust gas post treatment system and a method for operating said type of system that is simple to use and compact. This is achieved by virtue of the fact that the catalytic converter is a reductively or oxidatively operated catalytic converter, or that the introduction device, the catalytic converter, that can be operated reductively or oxidatively, and the fine particle filter are arranged in said sequence and in the exhaust line in the direction of flow.

14 Claims, 1 Drawing Sheet

100
5
6
1
2
3
4

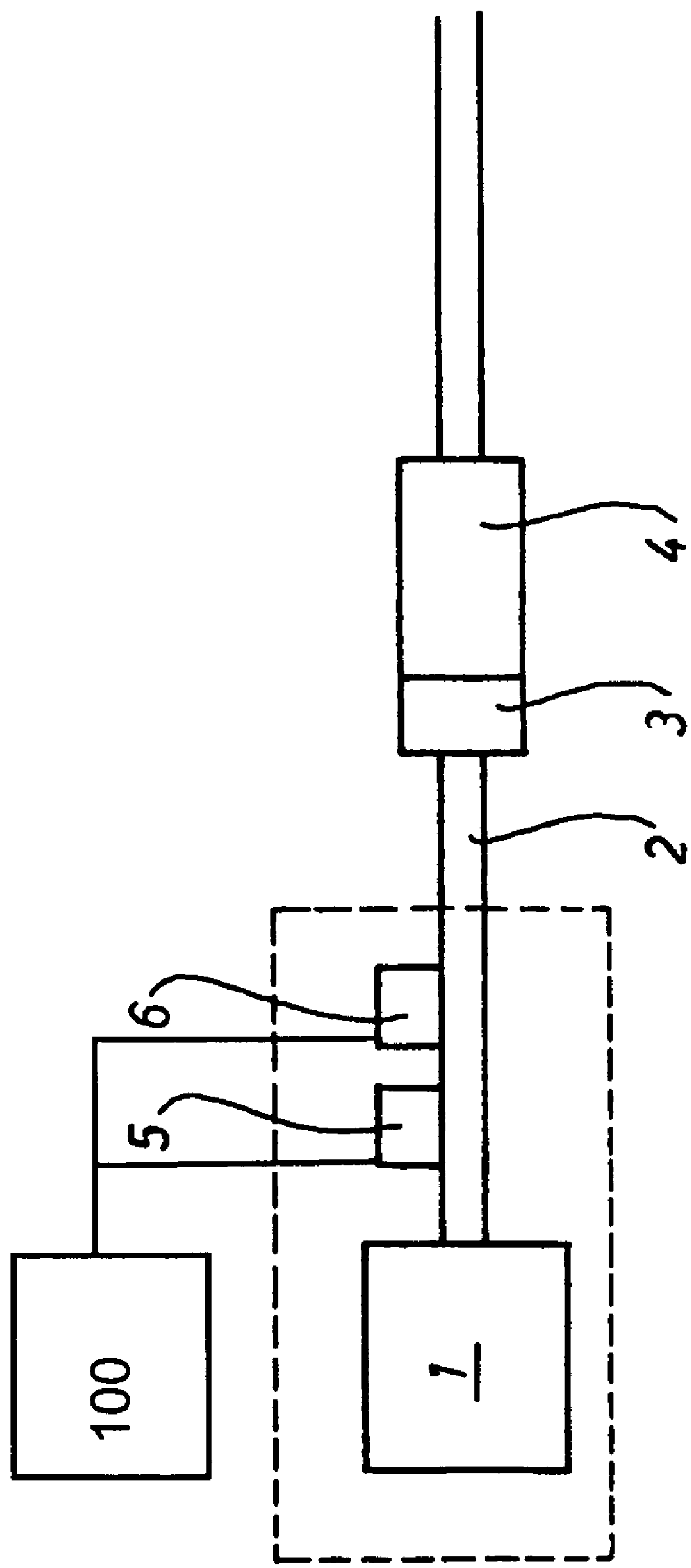
4
3
2
6
5
100
1

EXHAUST GAS AFTERTREATMENT SYSTEM

The present invention relates to an exhaust gas aftertreatment system, in particular for an auto-ignition internal combustion engine, including a catalyst located in an exhaust line, a particulate filter, and an introduction device for introducing a reducing agent upstream of the catalyst in the direction of the exhaust gas flow. The present invention further relates to a method for operating such an exhaust gas aftertreatment system.

BACKGROUND

An exhaust gas aftertreatment system of this type is described, for example, in European Patent EP 1 054 722 B1. This system provides a method and a device, wherein the pollutant-containing exhaust gas of a Diesel engine is initially introduced into an oxidation catalyst to convert NO contained in the gas stream to $NO_2$, and to increase the $NO_2$-content in the gas stream. Subsequently, the gas stream is introduced into a particulate filter to remove, in particular, soot from the exhaust gas. Then, the gas stream is fed into an SCR catalyst to reduce the NOx in the exhaust gas. In addition, cooling devices may be disposed in the exhaust treatment train, in particular upstream of the SCR catalyst. This system is complex in design and requires a not insignificant amount of installation space because the individual components are arranged in series one behind the other.

SUMMARY OF THE INVENTION

It is an object of the present invention to provide an exhaust gas aftertreatment system that is simpler and more compact than those known in the art, and also to provide a method for operating such an exhaust gas aftertreatment system.

The present invention provides an exhaust gas after treatment system, of where the catalyst is capable of being operated in both the reductive and oxidative mode; and in that the introduction device, the catalyst which can be operated in both the reductive and oxidative mode, and the particulate filter are arranged in the exhaust line in this order in the direction of flow. This embodiment provides a design which is much simpler than prior art approaches and which is characterized in that the oxidation catalyst and the SCR catalyst are combined into a single catalyst. Until now, the prevailing opinion was that an either/or function existed here and that a catalyst could not be operated in alternative modes, at least not with process reliability. Contrary to this opinion, using a suitable and accurately operating control system or controller, it was possible to successfully combine these functions into a single catalyst. Using this double function, the SCR catalyst, which was heretofore provided downstream of the particulate filter and had an introduction device between the particulate filter and the SCR catalyst, can now be completely eliminated from this position. Accordingly, the introduction device is disposed near the engine, upstream of the catalyst which can be operated in both the reductive and oxidative mode.

In one aspect, the catalyst is, in particular, a vanadium-based, a zeolite-based, or a metal-oxide-based SCR catalyst. These catalyst types have turned out to be particularly suitable for operation in both the reductive and oxidative mode.

In another aspect of the present invention, an introducing means for introducing hydrocarbons, in particular in the form of fuel, is disposed upstream of the catalyst. In a further aspect of the present invention, the introducing means and the introduction device for introducing a reducing agent, such as "AdBlue®", generically AUS32, are combined into one unit. This enables a compact design requiring little space. Preferably, the introducing means and/or the introduction device are placed directly at the internal combustion engine in the exhaust line that includes also the exhaust manifold, which collects the exhaust gas streams from the individual cylinders. This makes it possible to integrate the required control lines into existing wiring harnesses, and to integrate the control into an existing internal combustion engine controller. However, especially due to the integration into one unit, it is important that the introducing means and the introduction device be operated alternately. It must be ensured that only one system is active at any one time, which can be easily accomplished using suitable blocking means. This is assisted by the direct connection to the internal combustion engine.

In yet another aspect of the present invention, the catalyst and the particulate filter are combined into one unit, the particulate filter being located downstream of the catalyst. This further unit provides an overall extremely compact system, which is easily adaptable to an internal combustion engine and/or to a vehicle or a tool, even in very confined mounting environments. This ease of adaptation is assisted by the fact that the catalyst and the particulate filter need not be controlled externally, so that there is no need to route cables to these components.

BRIEF DESCRIPTION OF THE DRAWING

Other advantageous aspects of the present invention will become apparent from the description of the drawing of an engine, in which an exemplary embodiment illustrated in the figure is described in greater detail.

DETAILED DESCRIPTION

The only figure is a schematic view showing an internal combustion engine 1, which may be any type of Diesel engine. An exhaust line 2 (including an exhaust manifold) is connected to the exhaust ports of the engine. The exhaust gas emitted by the internal combustion engine during operation is passed through said exhaust line, subjected to exhaust aftertreatment (and possibly also to noise reduction), and is ultimately released into the environment. In order to treat the exhaust gas, the exhaust gas is initially passed through a catalyst 3 capable of being operated in both the reductive and oxidative mode, and subsequently through a particulate filter 4 (soot filter). In order to thermally regenerate particulate filter 4, the required temperature of about 400 ° C. is generated in catalyst 3 by exothermic oxidation of hydrocarbons (especially in the form of Diesel fuel). To this end, the hydrocarbons are introduced into the exhaust line via an introducing means or hydrocarbon introducer 5. Catalyst 3 oxidizes at least part of the introduced hydrocarbons exothermically, thereby raising the temperature of the exhaust gas.

During the remaining time, the same catalyst 3 is used as a reduction catalyst. In order for catalyst 3 to perform selective catalytic reduction of nitrogen oxides in the exhaust gas, a reducing agent (AdBlue®, generically AUS32) stored in a reservoir is introduced into the exhaust gas via an introduction device or reducing agent introducer 6.

Introducing means 5 and introduction device 6 are mounted as a unit directly to internal combustion engine 1 (as indicated by a broken-line box) and can be controlled by a controller 100, which can have a locking device to ensure only one system is active at any one time. Controller 100 may be an existing interval combustion engine controller. Catalyst 3 and particulate filter 4 are mounted in a common housing, possibly together with sound-damping elements.

List of Reference Numerals 1 internal combustion engine
2 exhaust line
3 catalyst
4 particulate filter
5 introducing means
6 introduction device
100 controller

What is claimed is:

1. An exhaust gas aftertreatment system, for an auto-ignition internal combustion engine, comprising:

a catalyst located in an exhaust line;

a particulate filter; and an reducing agent introducer for introducing a reducing agent into exhaust gas upstream of the catalyst in a direction of flow of the exhaust gas, a hydrocarbon introducer for introducing hydrocarbons into the exhaust gas, the hydrocarbon introducer disposed upstream of the catalyst, the catalyst positioned with respect to the reducing agent introducer and the hydrocarbon introducer in the exhaust line such that the catalyst oxidizes at least part of the introduced hydrocarbons and performs selective catalytic reduction of nitrogen oxides in the exhaust line.

2. The exhaust gas aftertreatment system as recited in claim 1 wherein the catalyst is a vanadium-based, a zeolite-based, or a metal-oxide-based SCR catalyst.

3. The exhaust gas aftertreatment system as recited in claim 1 wherein the reducing agent introducer and the hydrocarbon introducer are combined into one unit.

4. The exhaust gas aftertreatment system as recited in claim 3 wherein the reducing agent introducer and the hydrocarbon introducer are mounted directly to the internal combustion engine.

5. The exhaust gas aftertreatment system as recited in claim 1 wherein the catalyst and the particulate filter are combined into one unit with the particulate filter being located downstream of the catalyst.

6. The exhaust gas aftertreatment system as recited in claim 1 wherein the hydrocarbons are fuel.

7. The exhaust gas aftertreatment system as recited in claim 1 further comprising a controller controlling hydrocarbon introducer and the reducing agent introducer to operate the catalyst in alternate reductive and oxidative modes.

8. The exhaust gas aftertreatment system as recited in claim 1 wherein no additional selective reduction catalyst is provided in the exhaust line.

9. The exhaust gas aftertreatment system as recited in claim 1 wherein the catalyst is a vanadium-based SCR catalyst.

10. The exhaust gas aftertreatment system as recited in claim 1 wherein the catalyst is a zeolite-based SCR catalyst.

11. The exhaust gas aftertreatment system as recited in claim 1 wherein the catalyst is a metal-oxide-based SCR catalyst.

12. An exhaust gas aftertreatment system, for an auto-ignition internal combustion engine, comprising:

a catalyst located in an exhaust line operable in both a reductive and oxidative mode;

a particulate filter;

an reducing agent introducer for introducing a reducing agent into exhaust gas upstream of the catalyst in a direction of flow of the exhaust gas; and a hydrocarbon introducer for introducing hydrocarbons into the exhaust gas, the hydrocarbon introducer disposed upstream of the catalyst;

the reducing agent introducer, the catalyst, and the particulate filter being arranged in the exhaust line one after another in the direction of flow;

the catalyst positioned with respect to the reducing agent introducer and the hydrocarbon introducer in the exhaust line such that the catalyst oxidizes at least part of the introduced hydrocarbons and performs selective catalytic reduction of nitrogen oxides in the exhaust line.

13. The exhaust gas aftertreatment system as recited in claim 12 further comprising a controller controlling the hydrocarbon introducer and the reducing agent introducer to operate the catalyst in alternate reductive and oxidative modes, the reducing agent introducer introducing a reducing agent into the exhaust line in the reductive mode, the catalyst performing a selective catalytic reduction of nitrogen oxides in the exhaust gas when the reducing agent is in the exhaust line, the hydrocarbon introducer introducing hydrocarbons into the exhaust line in the oxidative mode, the catalyst oxidizing at least part of the introduced hydrocarbons.

14. A method for operating an exhaust gas aftertreatment system for an auto-ignition internal combustion engine, comprising a catalyst located in an exhaust line, a particulate filter, and a reducing agent introducer for introducing a reducing agent upstream of the catalyst in a direction of the exhaust gas flow, a hydrocarbon introducer for introducing hydrocarbons and disposed upstream of the catalyst, comprising:

alternately introducing the reducing agent and the hydrocarbons into the exhaust line, the catalyst alternately operating in a reductive mode and an oxidative mode, the catalyst operating in the reductive mode by performing a selective catalytic reduction of nitrogen oxides in the exhaust gas when the reducing agent the reducing agent is introduced into the exhaust line, the catalyst operating in the oxidative mode by oxidizing the hydrocarbons when the hydrocarbons are introduced into the exhaust line.

* * * * *